(12) United States Patent
Xie et al.

(10) Patent No.: US 8,075,751 B2
(45) Date of Patent: Dec. 13, 2011

(54) WATER CHLORINATOR HAVING DUAL FUNCTIONING ELECTRODES

(75) Inventors: Yuanwu Xie, Columbia, SC (US); Dennis Frederick Dong, Columbia, SC (US)

(73) Assignee: Finnchem USA, Inc., Eastover, SC (US)

( * ) Notice: Subject to any disclaimer, the term of this patent is extended or adjusted under 35 U.S.C. 154(b) by 256 days.

(21) Appl. No.: 12/252,692

(22) Filed: Oct. 16, 2008

(65) Prior Publication Data
US 2010/0096260 A1 Apr. 22, 2010

(51) Int. Cl.
*C25B 9/06* (2006.01)
*C25B 11/06* (2006.01)
*C25B 11/08* (2006.01)

(52) U.S. Cl. .................. 204/278.5; 204/275.1

(58) Field of Classification Search .............. 204/275.1, 204/278.5
See application file for complete search history.

(56) References Cited

U.S. PATENT DOCUMENTS

| | | | | |
|---|---|---|---|---|
| 3,632,498 A | * | 1/1972 | Beer | 204/290.12 |
| 3,751,296 A | * | 8/1973 | Beer | 204/290.12 |
| 3,778,307 A | * | 12/1973 | Beer et al. | 427/560 |
| 3,840,443 A | * | 10/1974 | Beer | 205/122 |
| 3,878,083 A | * | 4/1975 | De Nora et al. | 204/290.13 |
| 3,926,751 A | * | 12/1975 | De Nora et al. | 205/560 |
| 3,933,616 A | * | 1/1976 | Beer | 204/290.12 |
| 4,112,140 A | | 9/1978 | Heikel et al. | |
| 4,214,971 A | | 7/1980 | Heikel et al. | |
| 4,585,540 A | * | 4/1986 | Beer et al. | 204/290.09 |
| 4,760,041 A | | 7/1988 | Beaver et al. | |
| 5,112,464 A | | 5/1992 | Tsou et al. | |
| 6,391,167 B1 | | 5/2002 | Grannersberger | |
| 2002/0139689 A1 | * | 10/2002 | Zolotarsky et al. | 205/342 |

FOREIGN PATENT DOCUMENTS

| | | |
|---|---|---|
| WO | 2006005836 | 1/2006 |
| WO | 2007022572 | 3/2007 |

OTHER PUBLICATIONS

Leiderbach, Thomas A., "Metal Anodes" Kirk-Othmer Encyclopedia of Chemical Technology, Copyright John Wiley & Sons, Inc., Electrode Corporation, vol. 15, pp. 1-17.
Wojtowicz, John A., "Water Treatment of Swimming Pools, Spas, and Hot Tubs" posted ECT (online) Dec. 4, 2000, pp. 2-33.
Arikawa, T., et al. "Simultaneous determination of chlorine and oxygen evolving at RuO2/Ti and RuO2-TiO2/Ti anodes by differential electrochemical mass spectroscopy", 1988 Chapman & Hall; Journal of Applied Electrochemistry 28 (1998), pp. 511-516.
Burrows, I.R., et al. "Chlorine and Oxygen Evolution on Various Compositions of RuO2/TiO2 Electrodes" Electrochimica Acta, Pergamon Press, Ltd., 1978, vol. 23., pp. 493-500.
Spasojevic, M.D. et al. "Optimization of Anodic Electrocatalyst: RuOx/TiO2 on Titanium" J. Res. Inst. Catalysis, Jokkaido Univ., vol. 31, Nos. 2/3, pp. 77 to 94 (1983).

* cited by examiner

*Primary Examiner* — Bruce Bell
(74) *Attorney, Agent, or Firm* — Thomas, Kayden, Horstemeyer & Risley, LLP

(57) ABSTRACT

A water chlorinator includes an aqueous chloride ion source; and a pair of dual functional electrodes configured to electrolyze the aqueous chloride ion source, each one of the pair of dual functional electrodes comprising a titanium substrate and a mixed metal oxide coating deposited thereon and consisting essentially of ruthenium oxide and titanium oxide having a molar ratio of 5:95 to 25:75, respectively.

10 Claims, 1 Drawing Sheet

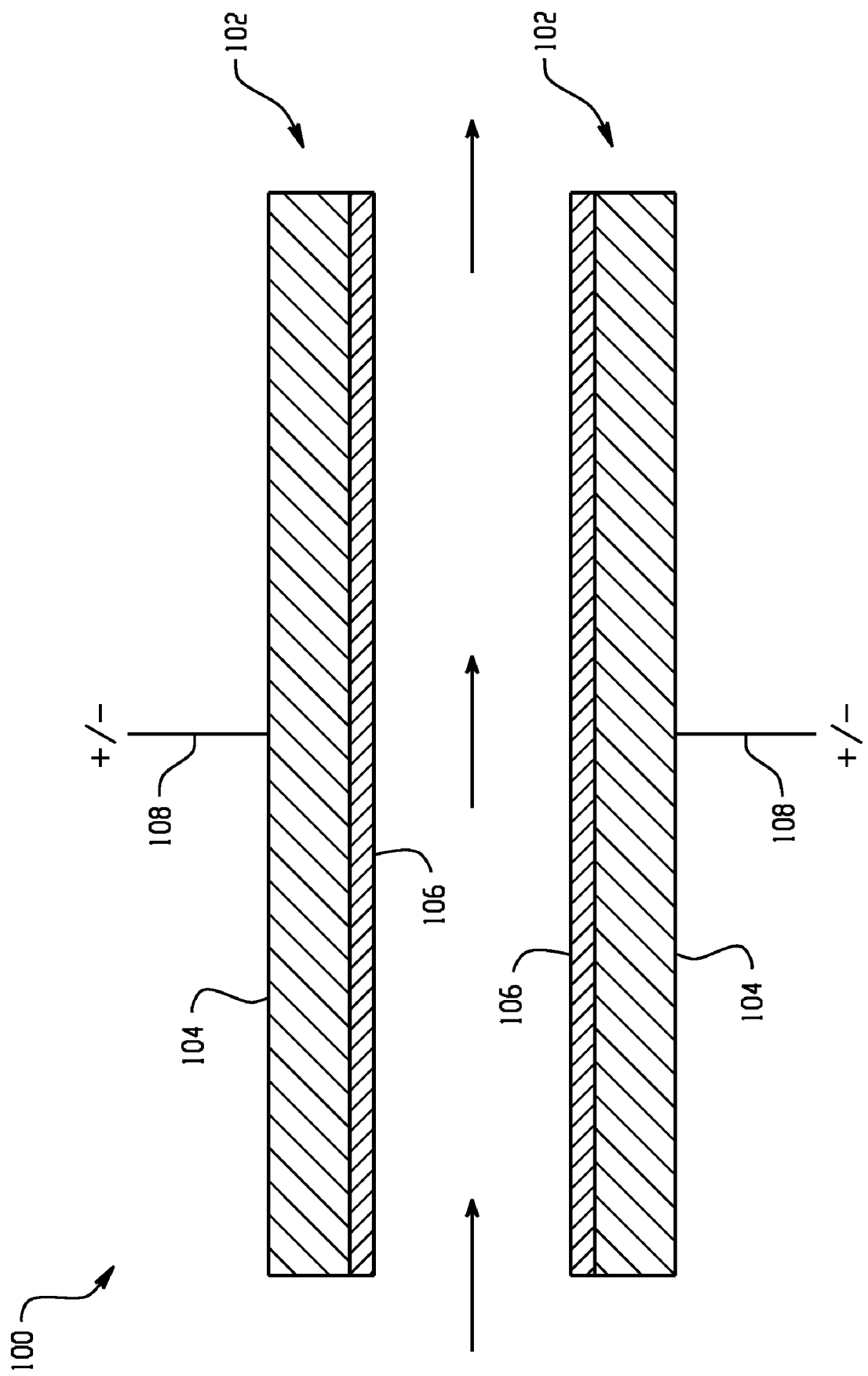

WATER CHLORINATOR HAVING DUAL FUNCTIONING ELECTRODES

BACKGROUND

The present disclosure generally relates to dual functioning electrodes adapted for anodic and cathodic use for a reverse current electrolytic chlorination apparatus such as may be desired for treating pool water, spas, and the like.

Electrolytic pool chlorinators have evolved to overcome the problems associated with chemical dosing of swimming pools, spas, and the like to prevent the accumulation growth of algae and bacteria therein. The electrolytic chlorinator generally includes two spaced apart electrodes including an anode for oxidation of chloride ions from, normally, sodium based chloride salts to chlorine, which subsequently hydrolyzes in solution to form hypochlorite; and a cathode for reduction of water to hydrogen. Water to be treated is dosed with the chloride salts and flows between the electrodes. The electrolytically generated chlorine and hypochlorite act as the active ingredients to oxidatively destroy bacteria and other harmful agents in the water.

One of the disadvantages associated with electrolytic disinfection is the cost of the electrolytic cell, as well as the cost of replacement electrodes, which can corrode, become fouled with scale and the like or otherwise become inactivated over time. These costs are primarily driven by the size of the electrodes, which are typically constructed from titanium coated with platinum or ruthenium. Electrodes having a surface area sufficient to generate adequate chlorine levels represent a significant portion of the cost of installing and maintaining an electrolytic disinfection system. In addition, electrolytic cell life is limited due to the current density through the cell over time.

In order to keep the electrodes clean and operating at maximum efficiency, the electrolytic current fed to the chlorinator can be configured with dual functional electrodes, wherein each electrode can dually function as the anode or cathode depending on whether the current flow is in the forward or reverse direction. This so called current reversal or reverse polarity operation exchanges the chemical reactions that occur on the respective electrodes and in doing so cleans the electrode surface. If mineral deposits are not removed from the chlorinator, the electrodes would soon cease to function because the deposits would cause the unit to reach a so-called "high voltage" cutoff, much like it does with current electrolytic cells that have single functioning electrodes.

One such dual functioning electrode is based on a coating of catalytic oxide mixture of ruthenium dioxide ($RuO_2$) and titanium dioxide ($TiO_2$) deposited onto a conductive substrate such as titanium. Based on its behavior as a continuous (unifunctional) anode, this particular mixed metal oxide is typically used at a mole ratio of about 40:60 to about 50:50 ($RuO_2$:$TiO_2$) formed on a titanium substrate. It is generally known that the operating lifetime of the coating for electrolytic applications depends to a large extent on the amount of the coating applied to the substrate. The total amount of ruthenium that is in a typical coating for electrolytic pool chlorinators is about 20 to about 30 $g/m^2$ as Ru metal, application of which is generally provided by solvent coating multiple layers, typically about 20 to 30 coats. At ruthenium concentrations below 40 mole %, durability is known to significantly decrease when analyzing its capability as a continuous anode. For example, as discussed in an article entitled, "Optimization of an Anodic Electrocatalyst: $RuO_2$/$TiO_2$ on Titanium", to Spasojevic et al. (J. Res. Inst. Catalysis, Hokkaido Univ. Vol. 31, Nos. 2/3, pp 77-94, 1983), when measuring the change in anode potential as a function of time for chlorine evolution at 3 $kA/m^2$, 80° C. and constant brine concentration, it was observed that durability was at a maximum at 40 mol % $RuO_2$ and decreased rapidly below 20%.

However, ruthenium is relatively expensive and efforts have been ongoing to reduce the amount of ruthenium used by use of less expensive metals. Because of this issue with durability when continuously functioning anodically without periodic reverse polarity, prior attempts to reduce the amount of ruthenium because of its expense have generally been directed to substitution of ruthenium with other metals, e.g., tin.

Accordingly, there remains a need for improved dual functioning electrodes that exhibit prolonged durability and use decreasing amounts of ruthenium.

BRIEF SUMMARY

Disclosed herein is a water chlorinator comprising an aqueous chloride ion source; and a pair of dual functional electrodes configured to electrolyze the aqueous chloride ion source, each one of the pair of dual functional electrodes comprising a titanium substrate and a mixed metal oxide coating deposited thereon and consisting essentially of ruthenium oxide and titanium oxide having a molar ratio of 5:95 to 25:75, respectively.

The disclosure may be understood more readily by reference to the following detailed description of the various features of the disclosure and the examples included therein.

BRIEF DESCRIPTION OF THE DRAWINGS

Referring now to the FIGURES wherein the like elements are numbered alike:

The FIGURE illustrates a partial sectional view of a water chlorinator.

DETAILED DESCRIPTION

Disclosed herein are dual functioning electrodes for water chlorinators. The dual function electrodes are formed of the same material and are configured to function as both anodically and cathodically depending on current polarization. In one embodiment, the dual function electrode includes a coating containing a mixed metal oxide consisting essentially of 5 to 25 mol % $RuO_2$ with the remainder $TiO_2$ deposited onto a conductive substrate, and in other embodiments, about 15 to 20 mol % $RuO_2$ with the remainder $TiO_2$ and in still other embodiments, about 15 mol % $RuO_2$. The total amount of ruthenium (Ru) in the coating is about 10 to 15 $g/m^2$, which is about 50% less than that previously used, thereby providing a significant commercial advantage. By way of example, in one embodiment, the molar ratio of ruthenium to titanium is 5:95 to 25:75 respectively; in other embodiments, 15:85 to 20:80, respectively, and in still other embodiments, the molar ratio is 15:85, respectively. As will be described in greater detail herein, it has unexpectedly been found that current efficiency and accelerated lifetime analysis for the relatively low ruthenium coating as noted above, when exposing the electrodes in a reverse current, was about the same as continuous anode formed of titanium having a coating at a 30:70 ratio of $RuO_2$ relative to $TiO_2$ (i.e., without reverse current). As noted above, previous studies had shown that anodes having lower $RuO_2$ content (i.e., less than 20%) exhibited poor durability relative to coatings with higher $RuO_2$ content, i.e., greater than or equal to 30 to about 40 mole %. Thus, these results were surprising and unexpected.

Suitable conductive substrates include, without limitation, titanium, lead, tantalum, tungsten, molybdenum, vanadium, zirconium, niobium, and the like.

A portion of the electrode may have a coating either applied to it or an additional strip of coated titanium may be spot welded to the electrode. The coating on the titanium is composed of ruthenium and titanium. The use of the same material makes it possible to use a reversal of polarity of the power source to have a self-cleaning effect and increase the lifetime of the cell before any maintenance is needed. In all applications, the conductive metal base is cleaned and free of oxide or other scale. This cleaning can be done in any way, by mechanical or chemical cleaning, such as, by sand blasting, etching, pickling or the like.

The ruthenium dioxide/titanium dioxide mixed metal oxide coating may be applied in various ways, and to various forms of the electrode including but not limited to, such as solid rolled plates, perforated plates, slitted, reticulated, plates, mesh and rolled mesh, woven titanium wire or screen, rods and bars and the like. Application can be by chemideposition in the form of solutions painted, dipped or sprayed on or applied as curtain or electrostatic spray coatings, baked on the metal base, but other methods of application, including electrophoretic deposition or electrodeposition, may be used. Care must be taken that no air bubbles are entrapped in the coating and that the heating temperature is below that which causes warping of the base material.

In one embodiment, the ruthenium dioxide and titanium dioxide mixed metal oxide coatings are formed from chemical precursors that are solvent coated onto the substrate. Multiple coatings are utilized to provide a ruthenium content of about 10 to about 15 $g/m^2$. The coated substrate is then thermally treated to provide the respective metal oxides. By way of example, $RuCl_3$ is dissolved in HCl and then dissolved in isopropanol together with $TiCl_4$. The solution can be coated onto the substrate and dried. Multiple coatings are provided to obtain the desired ruthenium content. The substrate is then thermally heated in a furnace or the like at a temperature and for a period of time effective to thermally decompose the salts and form the metal oxide coating. Suitable ruthenium precursors include, without limitation, $Ru(NO)(NO_3)_3$, $RuCl_3 \cdot 3H_2O$, $Ru(NH_3)_6Cl_3$, $RuCl_3NO \cdot xH_2O$ and others. Suitable titanium precursors include, without limitation, $Ti(OBu)_4$, $Ti(OEt)_4$, $Ti(OPr)_4$, $TiCl_3$, $C_{10}H_{10}TiCl_2$, and others. Other suitable precursors will be apparent to those skilled in the art in view of this disclosure.

The dual functional electrodes 102 as described above are disposed within a water chlorinator as is generally shown in the FIGURE by reference numeral 100. The dual functional electrodes are spaced apart from one another and are in electrical communication with a power source 108. Water to be treated is dosed with the chloride salts and flows between the electrodes. The power source 108 is in operative communication with a controller (not shown) configured to periodically reverse polarity such that the electrodes dually function for a selected period of time as an anode and then as a cathode. Each dual functional electrode 102 includes a base substrate 104 upon which a mixed metal oxide coating 106 consisting essentially of ruthenium and titanium is disposed. The electrodes 102 are not intended to function as a continuous anode or continuous cathode without current reversal since it is well known that durability becomes an issue. Reversal of current can be effected as frequently as necessary to maintain each surface substantially free of both mineral and biological deposits.

With respect to continuous operation as a cathode, the low ratio ruthenium coating is especially prone to spalling. When functioning cathodically, the cathode reacts with water to produce hydrogen atoms, which subsequently combine to form hydrogen gas. If the cathode is run continuously for extended periods of time, the hydrogen becomes absorbed and can react with the base substrate to form hydrides thereof, e.g., titanium hydride. The formation of hydrides and spalling of the coating are limiting variables affecting durability of the electrode. Formation of the titanium hydride, for example, would cause the catalytic coating to spall and the electrode would not function any more as an anode when the current is reversed.

The following examples are presented for illustrative purposes only, and are not intended to limit the scope of the invention.

EXAMPLE 1

In this example, a dual functional titanium electrode having a mixed metal oxide coating formed of ruthenium oxide and titanium oxide at a molar ratio of 15:85, respectively, was prepared.

To 3.6 g of ruthenium chloride hydrate was added 6 mL of 37% HCl. After stirring this mixture, 28.9 mL of orthobutyltitanate and 70 mL of n-butanol were added and the mixture was thoroughly mixed. A titanium sheet of thickness 0.04 inches was etched for 30 minutes in hot hydrochloric acid (20%) and then rinsed and dried in air. The coating solution was brushed onto the sheet of etched titanium and the coated titanium was then dried in air for 10 minutes. The coated sample was then placed into a muffle furnace at 450° C. for 10 minutes. After the sample was removed from the oven and allowed to cool, a second coat of the coating solution was applied in the same way; the sample was dried and then baked. This procedure was repeated multiple times over three days until the sample had achieved a coating loading of 14.4 grams of ruthenium per square meter of coated surface as measured by X-ray fluorescence spectroscopy. Each day after eight to ten coatings, there was an extended bake of one hour at 525° C. The ratio of titanium to ruthenium in the resulting coating was calculated to be 85:15.

A 0.8" diameter sample disc was then punched from the electrode of Example 1. A solution was prepared containing 0.5 molar sodium sulfate. The sample was placed into a tall form beaker with a platinum counter electrode and a saturated calomel reference electrode. The electrode sample was polarized alternately anodically and cathodically on a four minute cycle time (two minutes anodic, two minutes cathodic) using an Arbin Instruments MSTAT potentiostat. In this way, the electrode acted alternately as an anode and as a cathode, and different electrochemical reactions occurred on the surface of the electrode under each different condition. During operation as a cathode, the cathode potential generally remained the same, and the potential returned to the same value on each return to cathodic polarization. On anodic polarization, the potential remained generally the same until, after 69 hours, the anodic potential of the sample rose more than two volts over the starting potential, indicating failure of the coating. The sample surface showed small pockets of exposed substrate, indicating delamination of the coating from the titanium substrate. The unit lifetime was calculated to be 4.8 hours per gram of ruthenium per square meter.

EXAMPLE 2

In this example, a dual functional titanium electrode having a mixed metal oxide coating formed of ruthenium oxide and titanium oxide at a molar ratio of 20:80, respectively, was prepared.

To 0.354 g of ruthenium chloride hydrate was added 6 mL of 37% HCl. After stirring this mixture, 10.3 mL of titanium chloride (8.4% $TiCl_3$ in 30% HCl) and 40 mL of isopropanol were added and the mixture was thoroughly mixed. A titanium sheet of thickness 0.04 inches was etched for 30 minutes in hot hydrochloric acid (20%) and then rinsed and dried in air. The coating was applied as described in Example 1 until the loading had reached 7.0 grams of ruthenium per square meter of coated surface as measured by X-ray fluorescence spectroscopy. The ratio of titanium to ruthenium in the coating is calculated to be 80:20.

This sample was placed under an accelerated life test as explained in Example 1. After 48.5 hours, the anodic potential of the sample rose more than two volts over the starting potential, indicating failure of the coating. The sample surface showed small pockets of exposed substrate, indicating delamination of the coating from the titanium substrate. The unit lifetime was calculated to be 6.9 hours per gram of ruthenium per square meter.

COMPARATIVE EXAMPLE 1

In this example, a dual functional titanium electrode having a coating formed of ruthenium oxide and titanium oxide at a molar ratio is 30:70, respectively, was prepared.

The electrode was prepared in accordance with Example 1 using the following quantities to prepare the coating solution: 7.2 g of ruthenium chloride hydrate, 6 mL of 37% HCl, 23.8 mL of orthobutyltitanate and 70 mL of n-butanol. The coating was applied as described in Example 1 until the loading had reached 28.5 grams of ruthenium per square meter of coated surface. The ratio of titanium to ruthenium in the coating is calculated to be 70:30.

This sample was placed under an accelerated life test as explained in Example 1. After 69 hours, the anodic potential of the sample rose more than two volts over the starting potential, indicating failure of the coating. The sample surface showed small pockets of exposed substrate, indicating delamination of the coating from the titanium substrate. The unit lifetime is calculated to be 2.4 hours per gram of ruthenium per square meter.

From comparison of the results of the preceding example 1 and comparative example 1, it is evident that the same accelerated lifetime can be obtained from the sample formed from the teachings of this invention, with much less ruthenium, compared to the coating formed according to the prior art for anodes for chlorine evolution (not dual purpose). Thus, even though one half the amount of the expensive precious metal, ruthenium, is employed, a useful and long-life electrode for pool cell electrolysis has been shown.

In order to compare all three samples in the different amounts of ruthenium loading, one can compare the unit lifetimes, the lifetime duration divided by the loading of the precious metal. The following table indicates that the two examples of the present invention from Examples 1 and 2 have greater unit lifetimes compared to that for the coating with a coating ratio as recommended by the prior art.

TABLE 1

| Example | % Ru in the Coating | Unit Lifetime, hr-m²/g |
|---|---|---|
| 1 | 15 | 4.8 |
| 2 | 20 | 6.9 |
| Comp. 1* | 30 | 2.4 |

*comparative example

Current efficiency tests of the samples made under the same conditions as Example 1 and Comparative Example 1 were carried out as follows. The electrodes were placed as anodes into a bath containing a solution of 3.0 grams of sodium chloride per liter of solution at pH about 7. During electrolysis, the oxygen gas evolving from the anode was collected in a gas sample collection tube. The competing reaction of chlorine evolution produced chlorine gas, which dissolved and hydrolyzed in the solution to produce sodium hypochlorite. The amount of oxygen gas evolved within a set amount of time was compared with the amount of gas evolved with the same experiment but with sodium sulfate substituting for the sodium chloride in the solution. Using the sample produced according to the control test of Comparative Example 1, the current efficiency for chlorine was measured to be 61%. For the sample produced according to Example 1, the current efficiency for chlorine was measured to be the same or marginally better, 62%. Thus, the same or improved current efficiency for chlorine evolution can be obtained from a sample made according to the invention described here, even though only one half of the expensive precious metal, ruthenium, has been used.

As shown, the current efficiency and accelerated lifetime was unexpectedly similar to the comparative example, indicating that robust performance can occur upon a reduced loading ratio of ruthenium in the coating when cycling current flow direction.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A water chlorinator, comprising:
   an aqueous chloride ion source; and
   a pair of dual functional electrodes configured to electrolyze the aqueous chloride ion source, each one of the pair of dual functional electrodes comprising a conductive substrate and a mixed metal oxide coating deposited thereon consisting essentially of ruthenium oxide and titanium oxide having a molar ratio of 5:95 to 25:75, respectively.

2. The water chlorinator of claim 1, wherein the molar ratio of the ruthenium to the titanium is 15:85 to 20:80, respectively.

3. The water chlorinator of claim 1, wherein the molar ratio of the ruthenium to the titanium is 15:85, respectively.

4. The water chlorinator of claim 1, wherein the ruthenium in the mixed metal oxide coating is at a loading of 5 to about 20 g/m².

5. The water chlorinator of claim 1, wherein the ruthenium in the mixed metal oxide coating is at a loading of 10 to about 15 g/m².

6. The water chlorinator of claim 1, wherein the dual functional electrode is a mesh screen.

7. The water chlorinator of claim 1, wherein the dual functional electrode is a plate.

8. The water chlorinator of claim 1, wherein the conductive substrate is selected from the groups consisting of titanium, lead, tantalum, tungsten, molybdenum, vanadium, zirconium, and niobium.

9. The water chlorinator of claim 1, wherein the conductive substrate is titanium.

10. The water chlorinator of claim 2, wherein the conductive substrate is titanium.

* * * * *